United States Patent Office 3,539,848
Patented Nov. 10, 1970

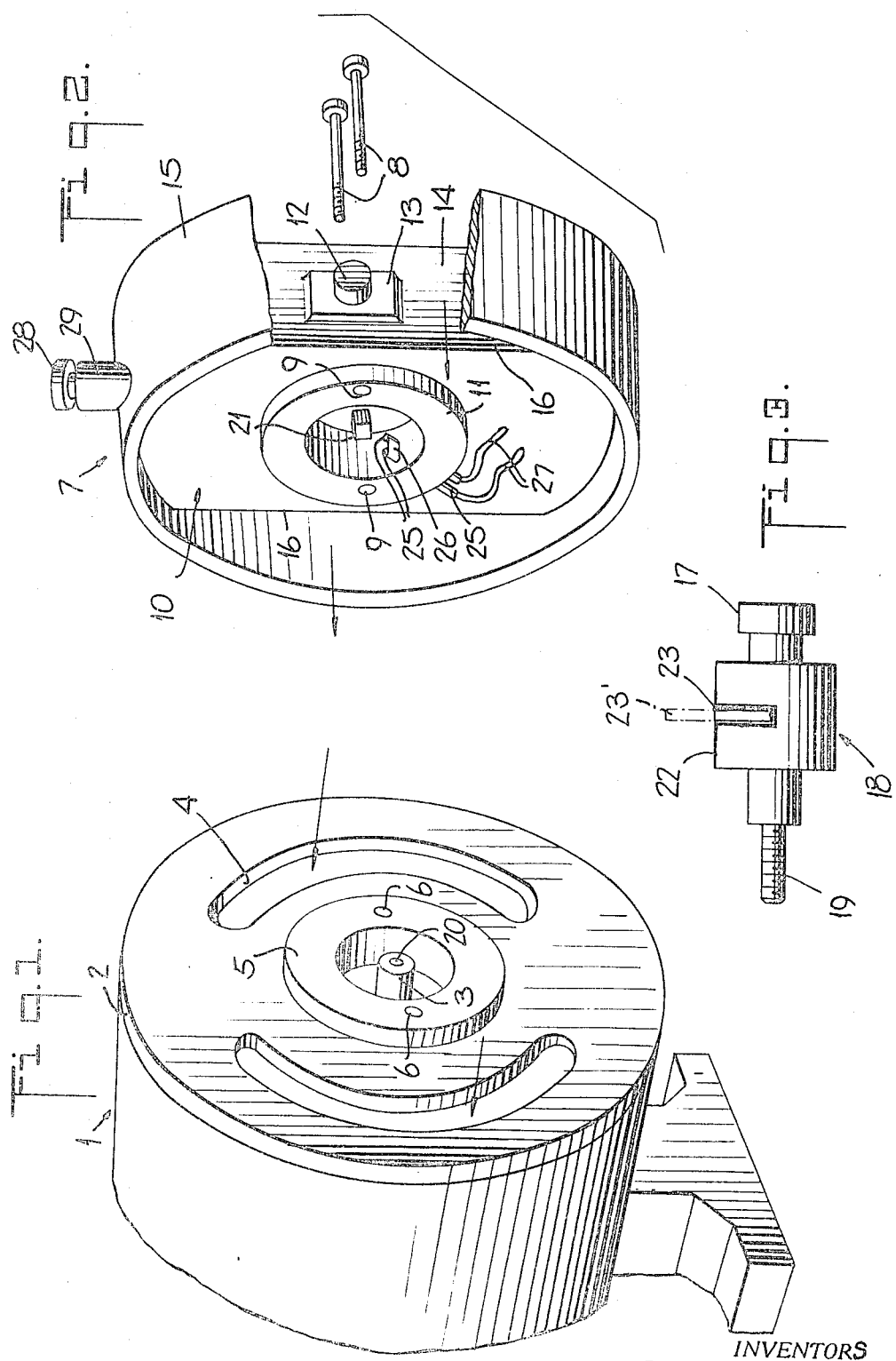

3,539,848
MOUNTING ARRANGEMENT FOR THE COOLING OF MOTOR CONTROL CIRCUIT ELEMENTS
Peter Dosch, Jona, St. Gall, and Manfred Oehmann, Ebnat-Kappel, St. Gall, Switzerland, assignors to Heberlein & Co. A.G., Wattwil, St. Gall, Switzerland, a corporation of Switzerland
Filed Nov. 21, 1967, Ser. No. 684,767
Claims priority, application Switzerland, Nov. 22, 1966, 16,727/66
Int. Cl. H02k 1/32, 11/00
U.S. Cl. 310—64      3 Claims

ABSTRACT OF THE DISCLOSURE

The circuit components for controlling the speed of a motor are mounted on and imbedded within a block arranged to be joined to the motor housing at one end. The components of the circuit requiring cooling are mounted within air passages aligned with the normal cooling ducts in the motor housing.

---

Many control devices are known for electric motors which contain apparatus for regulating the speed of revolution thereof and, generally, various additional circuit elements as, for example, fuses, safety switches, tachometer generators which cooperate with the control apparatus for the revolution speed, and so on. It has been customary, heretofore, to locate the speed control apparatus and other circuit elements separate from the motor, either on consoles, shelves or the like, to the extent that certain parts of the installation did not have to be connected mechanically with the motor as is the case with a tachometer generator. Mounting these circuits on the motor generally involves additional expense. It is often particularly difficult with portable motors to place the necessary circuit in a workable location. It is also necessary to arrange that those elements of the speed control apparatus which become heated by the passage of motor current during operation are located for adequate cooling.

An object of the present invention is to provide a device which can be mounted in a very simple fashion, which is economic as to space and cost, and which has provision for the necessary cooling of components.

The invention relates to the physical embodiment of a circuit for controlling the speed of revolution of an electric motor, the arrangement being such as to provide openings or passages for cooling air to pass therethrough. According to the invention, the structure incorporating the control circuit is provided with the necessary means for securing it to one end of the electric motor with at least one element of the circuit which controls the speed of revolution and which requires cooling being located in the path of the air which normally cools the motor. A particularly advantageous embodiment is characterized by a block of synthetic material in which elements of the control circuit are embedded, the element requiring cooling, for example, a thyristor, being mounted on a lateral face of the block in an air duct or passage formed between the block and a ring encircling the block. The assembly may be of such shape that it can be mounted on a flange of the motor instead of on the shield. It may also be advantageous for the assembly, according to the invention, to comprise a tachometer generator and/or a safety switch actuated by centrifugal force which prevents the motor, for example, a series wound motor, from rotating at an excessive speed in case of failure of the speed control circuit.

The invention will be better understood after reading the following description of the presently preferred embodiment thereof with reference to the appended drawings wherein:

FIG. 1 is a perspective view of a portion of an electric motor from which a part of the shield has been removed;

FIG. 2 is a perspective view, with a portion broken away for clarity, of the principal structure embodying the present invention; and FIG. 3 is a plan view of a detail forming a part of the control circuit.

Throughout the figures, the same reference numerals will be used to designate the same or similar parts.

Referring to FIG. 1, an electric motor is equipped on the end shown with a bearing shield 2 on which is mounted a bearing (not visible in the drawing) for the shaft 3 of the rotor. The shield 2 is provided with two large annular slots 4 which extend circumferentially near the periphery and serve to admit cooling air in the direction of the arrows. A flange 5 mounted on the shield 2 is usually covered by a shield or cover (not shown) which is secured by screws engaged in screw holes 6. The shaft or arbor 3 passes through the bearing shield on the side of the motor which is not represented in the drawing and may be equipped with a belt pulley or the like.

Instead of the usual cover, an assembly 7, as shown in FIG. 2, is secured to the bearing shield 2 by means of two screws 8, 8 which engage the screw holes 6. For this purpose the screws 8 are passed through holes 9, 9 which are provided in a body 10 of the assembly 7, the latter being provided with a flange 11 which contacts the flange 5 on the motor.

The body 10 consists of an artificial or synthetic resin in which most of the elements of the speed control circuit, such as transistors, diodes, resistors, condensers and so on, are embedded. The speed control circuit may, for example, be of the kind described in our copending United States application Ser. No. 674,580, filed Oct. 11, 1967. Details of the circuit form no part of the present invention and will not be described in further detail here.

A thyristor 12 forming a part of the speed control circuit is mounted externally of the body or block 10 on a mounting element 13 located on the lateral face 14 of the body. The body 10 is encircled or embraced by a ring 15 which extends beyond the surfaces of body 10 in the axial direction. The diameter of the ring 15 is chosen such that its extending portion can telescope over the bearing shield 2 engaging the periphery thereof. The side 14 of the body 10 and the ring 15 define an air conducting channel or duct 16 through which cooling air may pass to one of the slots 4 in the bearing shield 2. A symmetrical air channel or duct 16 is located on the side of the body 10 which is not visible in FIG. 2. It can be seen that the thyristor 12 through which the motor current flows and which has a power loss which is not insignificant is efficiently cooled by the current of air.

The speed control circuit is so constructed that a voltage must be fed thereto which is proportional to the speed of rotation of shaft 3. For this purpose, a tachometer generator is provided comprising a permanent magnet 17 (see FIG. 3) secured to one end of the shaft or rotor 18. The other end of shaft 18 is provided with a threaded stud 19 which is screwed into a screw hole 20 located in the end of shaft 3 (FIG. 1). After mounting of the assembly 7 on the end of the motor, the magnet 17 is situated between two pole shoes 21 (only one of which is shown in FIG. 2) of the stator of the tachometer which is provided in the assembly but not represented in detail.

The rotor 18 of the tachometer is provided with a groove 22 in the shape of a circular segment. A knife element 23 is mounted within the groove 22. The knife element is under the influence of a spring which is not shown in the drawing. The arrangement is such that when the speed of rotation of the rotor 18, representing the speed of rotation of shaft 3, exceeds a certain maximum value, the knife element 23 is moved because of the centrifugal force overcoming the tension of the spring so that its end protrudes from the groove 22 as shown by the dashed lines 23'.

As best seen in FIG. 2, two conductive pins 25 extend through the flange 11 in the radial direction and are interconnected on the interior of the flange by a thin strip of copper 26. The ends of the pins projecting radially outwardly of the flange are connected with separate conductors 27, 27, which conductors enter the body 10 and connect to the circuit embedded therein. The embedded circuit is connected with the motor 1 by conductors (not shown) so that the motor current flows through the copper strip 26. Assuming that the knife 23 assumes the position designated by the dashed lines 23', the knife will cut the copper strip 26 so that the motor is deenergized.

Although the safety switch formed by the elements 23 to 26, as described above, protects the motor from excessive speeds in response to failure of the speed control circuit, the usual fuse 28 can be provided in the motor circuit to disconnect the motor under overload, particularly when short circuits occur. The fuse is screwed into the conventional screw mounting which is located on the ring 15. Further elements of the device, according to the invention, while not shown, may be placed on the ring 15, such as terminals for connecting the motor to the mains, switch buttons to start and stop the motor, regulating knobs, particularly a knob for selecting the speed which it is desired to maintain constant, and so forth.

Although in the example described above a shield or cover was removed from the motor 1 prior to installation of the assembly 7, this may, in certain circumstances, not be necessary. Where the motor shaft projects from the bearing shields on both sides of the motor, provision may be made in the assembly 7 to accommodate such extention of the motor shaft enabling the assembly to be secured to one end of the motor housing without removal of the aforementioned shield. If a known speed control circuit is employed which does not require a tachometer generator then generator 17 to 21 may be omitted. It should also be evident that the safety switch 23 to 26 may be omitted. The ring 15 may be screwed or otherwise attached to the motor 1 independently of the body or block 10. In such case, the assembly containing the speed control circuit comprises only the body 10 and the elements which are embedded in or fixed thereon. In case such elements as 28 and 29 are mounted on the periphery of body 10, suitable slots should be provided in the ring 15 to accommodate same.

Having described the invention with reference to the presently preferred embodiment thereof, it will be evident that numerous changes may be made in the construction thereof without departing from the true spirit of the invention as defined in the appended claims.

What is claimed is:
1. An arrangement for mounting the circuit components for controlling the speed of an electric motor comprising a structure bearing said components, means for joining said structure to an end of a motor housing over the motor shaft, said structure being provided with at least one air passage therethrough disposed for alignment with a cooling duct in the motor housing, at least one of said circuit components which generates heat during operation being mounted within said air passage, a tachometer generator stator mounted on said structure, and a tachometer generator rotor including a permanent magnet arranged to be joined co-linearly to said motor shaft whereby said magnet cooperates with said stator when both said structure and said rotor are joined to said motor.

2. An arrangement for mounting the circuit components for controlling the speed of an electric motor comprising a structure bearing said components, means for joining said structure to an end of a motor housing over the motor shaft, said structure being provided with at least one air passage therethrough disposed for alignment with a cooling duct in the motor housing, at least one of said circuit components which generates heat during operation being mounted within said air passage, a safety switch having a pivotally supported spring biased knife element arranged to be joined to said motor shaft, and a severable link of conductive material mounted on said structure in the path assumed by said knife element when the latter is urged by centrifugal force away from its spring biased position, said link being coupled in the motor control circuit for interrupting the current supplied to the motor when said link is severed.

3. An arrangement according to claim 2, wherein said knife element is carried by the rotor of a tachometer generator which is provided with means for joining it co-linearly to the shaft of the motor, and a tachometer generator stator is mounted on said structure for cooperation with said tachometer rotor when both said structure and said rotor are joined to said motor.

References Cited

UNITED STATES PATENTS

| | | | |
|---|---|---|---|
| 3,356,873 | 12/1967 | Tamm | 310—52 X |
| 3,295,046 | 12/1966 | Margaira | 310—68 X |
| 3,160,771 | 12/1964 | Martin et al. | 310—68 |
| 3,041,484 | 6/1962 | Freer et al. | 310—68.4 |
| 2,934,662 | 4/1960 | Robinson | 310—68.4 |
| 2,338,515 | 1/1944 | Johns | 310—68.3 |

MILTON O. HIRSHFIELD, Primary Examiner

M. O. BUDD, Assistant Examiner

U.S. Cl. X.R.

310—68